United States Patent [19]

Franz et al.

[11] Patent Number: 5,033,192
[45] Date of Patent: Jul. 23, 1991

[54] HAND-HELD TOOL WITH CUTTING OR GRINDING DISK

[75] Inventors: Hoyss Franz, Wackersberg; Reitberger Rudold, Munich, both of Fed. Rep. of Germany

[73] Assignee: Hilti Aktiengesellschaft

[21] Appl. No.: 547,622

[22] Filed: Jul. 2, 1990

[30] Foreign Application Priority Data

Jul. 1, 1989 [DE] Fed. Rep. of Germany ....... 3921778

[51] Int. Cl.⁵ .......................... B25F 5/02; B24B 27/08; B28D 7/02; B28D 1/22
[52] U.S. Cl. ....................................... 30/124; 30/390; 51/273
[58] Field of Search .................................. 30/389–391, 30/124; 125/13.01; 51/268, 273

[56] References Cited

U.S. PATENT DOCUMENTS

| 3,882,598 | 5/1975 | Earle et al. | 30/390 |
| 4,192,104 | 3/1980 | Patenaude | 51/273 |
| 4,466,187 | 8/1984 | Morimoto | 30/124 |
| 4,675,999 | 6/1987 | Ito et al. | 30/124 |

Primary Examiner—Douglas D. Watts
Attorney, Agent, or Firm—Toren, McGeady & Associates

[57] ABSTRACT

In a hand-held tool, a drive shaft (11) mounts a cutting or grinding disk (4) with a protective hood (5) partially enclosing the disk. The hood has an opening through which a portion of the disk projects. The hood (5) encloses a space divided by a guide wall (12) into a recovery space (14) extending inwardly from the hood opening and a diversion space (13) on the opposite side of the drive shaft from the hood opening. Waste material generated by the disk flows from the diversion space into an outlet stub (16).

9 Claims, 3 Drawing Sheets

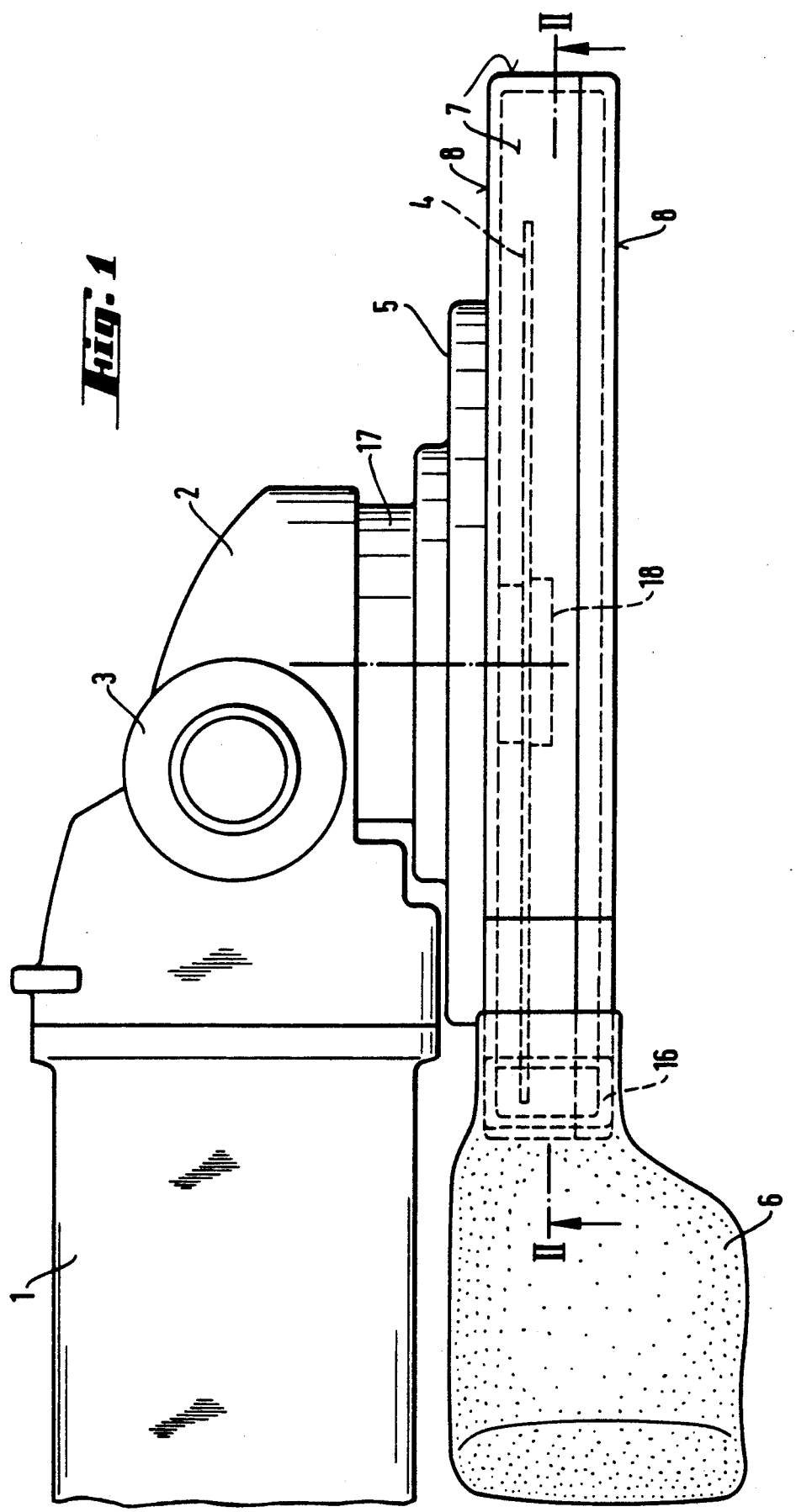

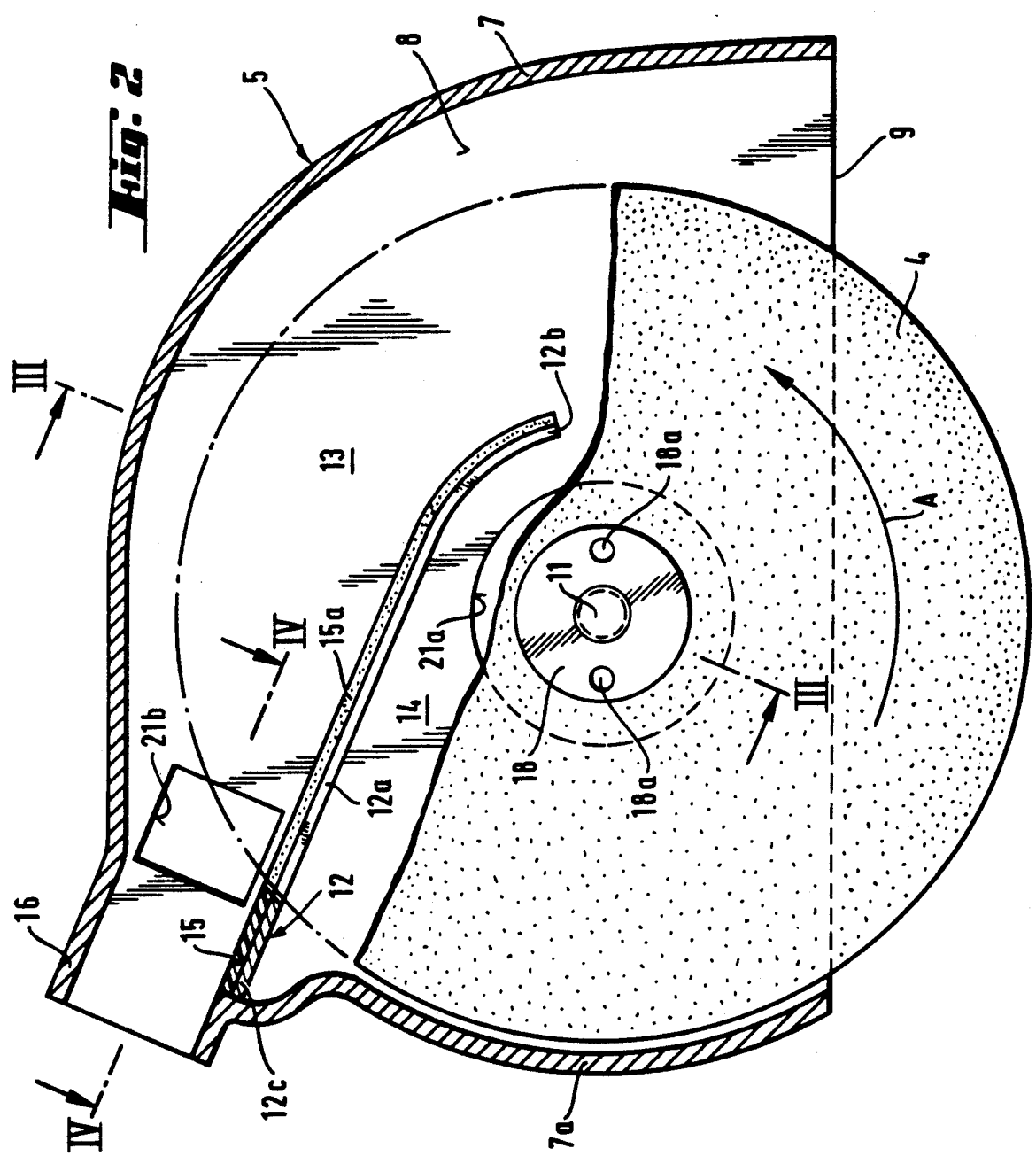

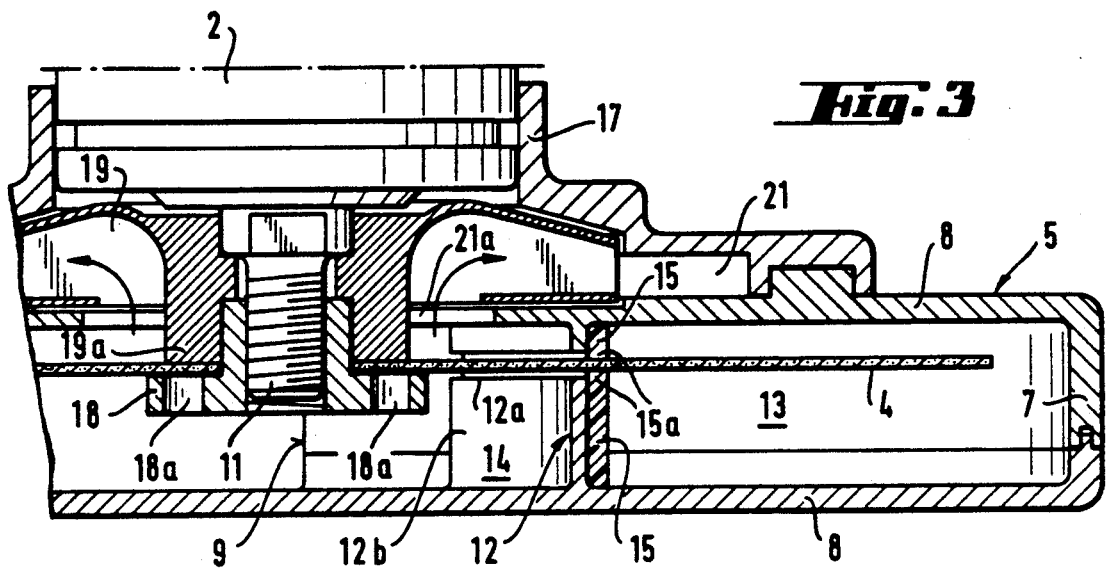
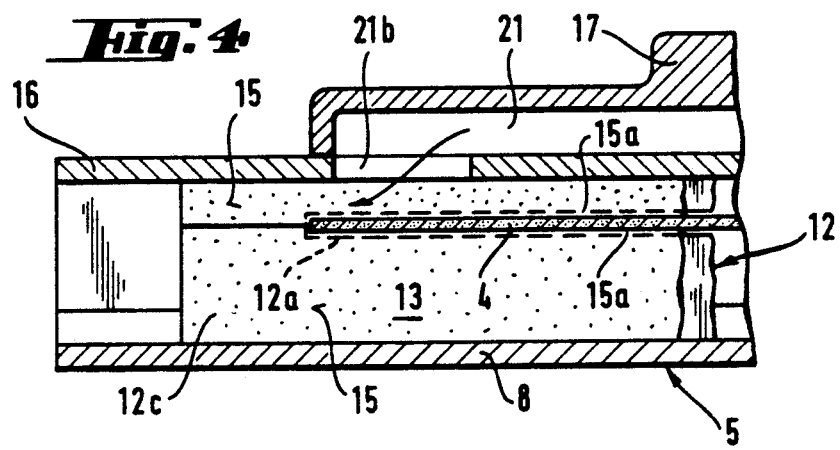
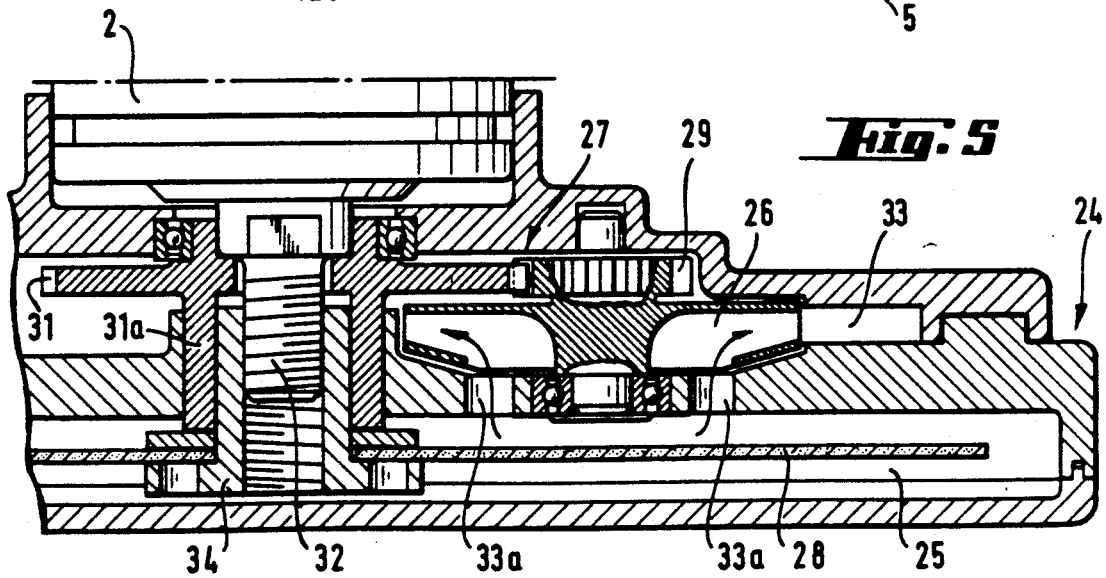

5,033,192

HAND-HELD TOOL WITH CUTTING OR GRINDING DISK

BACKGROUND OF THE INVENTION

The present invention is directed to a hand-held tool with a cutting or grinding disk mounted on a drive shaft, and a protective hood partially enclosing the disk having end walls extending parallel on opposite sides of the disk, and a side wall extending around a part of the disk circumference and connecting the side walls together. An outlet stub, for carrying off waste materials generated by the disk, extends through the side wall and outwardly from the hood. In addition, the hood has an opening through which a portion of the disk extends.

A hand-held tool with a cutting or grinding disk partially enclosed by a protective hood is disclosed in U.S. Pat. No. 3,585,980. This tool has an outlet stub discharging waste material from an interior space in the hood, and the stub is possibly connected with a vacuum source. The stub removes waste material basically in the form of dust which has been generated by the disk and is confined within the interior space of the protective hood.

Due to the rotation of the disk, the waste material has a flow direction within the hood corresponding to the rotary motion of the disk from the point where the disk reenters the opening in the hood and can flow out of the hood opening due to the rotation of the disk. In this arrangement only a very small part of the waste material is carried off through the outlet stub. The remainder of the waste material is deposited in an obstructive manner in the region where the disk projects from the opening in the hood.

SUMMARY OF THE INVENTION

The primary object of the present invention is to provide a hand-held tool of the above type which prevents deposition of the waste material in the region where the disk projects from the protective hood opening.

In accordance with the present invention, the interior of the protective hood is subdivided by a guide wall forming a deflecting baffle extending between the hood end walls and with the guide wall having a slot through which the disk can rotate. The guide wall extends inwardly in a generally chordal manner form the side wall toward the center of the interior space. As a result, the interior space is divided into a diversion space between one side of the guide wall and the facing side wall and a recovery space located between the opposite side of the guide wall and the hood opening. At least the diversion space is connected with the outlet stub.

Since, viewed in the rotational direction of the disk, the recovery space is downstream of the diversion space, the waste material is directed form the working point of the disk into the diversion space and is directed by the guide wall, so that it cannot flow into the recovery space and flow back to the opening or working point of the disk. Due to the connection of the diversion space with the outlet stub, the waste material flows out of the diversion space, and the outflow can be assisted by suction means connected to the outlet stub. If minor amounts of the waste material enter the recovery space and flow into the region of the disk working point, such minor portion is conveyed into the diversion space, because of the turbulence generated by the rotary motion of the disk and it flows out through the outlet stub.

Removal of the waste material through the outlet stub is assisted by forming the end region of the guide wall adjacent t the side wall in alignment with the wall of the outlet stub.

The opposite end region of the guide wall adjacent to the center of the hood is preferably bent around a radius and curves toward the drive shaft. Because of this arrangement of the guide wall near the center of the disk, any part of the waste material not initially conveyed to the outlet stub through the deviation space flows around the curved end of the guide plate into the deviation space and is directed away from the working point of the disk. With the end region of the guide wall curved through an angle of 30° to 60° there is an adequate overlap of the center of the disk.

Preferably, the guide wall has sealing lips of an elastic material extending along both sides of the slot in the guide wall through which the disk rotates, so that an improved removal of the waste material is achieved. The sealing lips are formed of closed cell rubber and can be provided by a layer of such material on the side of the guide wall facing the diversion space. Particles of the waste material carried along by the disk during operation of the tool are wiped off by the sealing lips and retained in the diversion space.

In a preferred arrangement, the recovery space is in communication with the outlet stub through a diversion channel, so that any part of the waste material remaining in the recovery space in spite of the turbulence caused by the rotary motion of the disk, is carried off to the outlet stub. For effecting such flow, a blower rotor withdrawing air from the recovery space for flow to the outlet stub is provided in the region of the diversion channel adjacent to the recovery space. Negative pressure developed by the blower rotor is in communication with the recovery space through the diversion channel, accordingly, aspiration of waste material away from the working point takes place. The positive pressure side of the diversion channel downstream of the blower rotor discharges into the outlet stub.

In one preferred arrangement, the blower rotor is positioned on the drive shaft of the disk. This arrangement affords a simple design by avoiding separate drive shafts for the blower rotor and the disk.

To improve efficiency, the blower rotor can be connected through step-up gearing with the drive shaft of the disk. Such an arrangement increases the rpm of the drive shaft operating at 6000 rpm to approximately 20000 rpm for the blower rotor. This step-up arrangement results in obtaining full advantage of the efficiency of the blower rotor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a side view of a hand-held tool embodying the present invention and mounting a protective hood;

FIG. 2 is a top view, partly in section, of the hood taken along the line II—II in FIG. 1;

FIG. 3 is a partial sectional view through the protective hood taken along the line III—III in FIG. 2;

FIG. 4 is a partial sectional view through the protective hood taken along the line IV—IV in FIG. 2;

FIG. 5 is a partial sectional view of another embodiment of a protective hood similar to the arrangement shown in FIG. 3.

DETAILED DESCRIPTION OF THE INvENTION

In FIG. 1 a hand-held tool is illustrated and the tool is characterized as a so-called right angle grinder. The tool includes a motor housing 1, a gearing head 2 flanged to the housing, and an additional handle 3 protruding sideways from the gearing head. A disk 4 used as a cutting or grinding disk is located, in part, within a protection hood 5 with a dust collection bag 6 secured to and extending outwardly from the hood.

As displayed in FIG. 2, disk 4 is enclosed around approximately two thirds of its circumference by a side wall 7 and end walls 8 of the protective hood 5. A segment of the disk 4 extends out of the protective hood 5 through a working opening 9. The opening 9 is defined on opposite sides of the disk 4 by the edges of parallel end walls 8 and in the axially direction of the disk by the edges of the side wall 7. The disk 4 is secured on a drive shaft 11 projecting from the gearing head 2, and the drive shaft imparts a rotary motion to the disk in the direction of the arrow A.

The interior of the hood is divided by a guide wall 12 extending initially chordally inwardly from the side wall 7 generally towards the center of the interior of the hood. In addition, the guide wall extends in the axial direction of the disk between the end walls 8. As a result, the hood interior is divided into a diversion space 13 spaced from the drive shaft 11 and a recovery space 14 containing the drive shaft 11. The diversion space 13 is bounded radially inwardly in the hood interior by the guide wall 12 and radially outwardly by the side wall 7, the recovery space 14 is bounded by the working opening 9, the portion 7a of the side wall 7 extending from the guide wall 12 to the working opening and the guide wall 12. In the rotational direction of the disk 4 shown by the arrow A, as the disk is used it generates dust like material carried by the rotational action of the disk into the diversion space 13. On the side of the guide wall 12 facing into the diversion space 13 there is a layer 15 of closed cell rubber. The guide wall 12 has a slot 12a extending along its length parallel to the end walls 8 so that the disk can rotate through the slot. Note FIG. 3 that the disk is in spaced relation with the adjacent edges of the slot 12a. The layer 15 of rubber or the like is similarly slotted, however, it has a pair of edges or lips 15a extending along the slot 12a with the lips in contact with the surface of the disk 4. In the region of the guide wall 12 adjacent to the drive shaft 11, the inner end 12b of the guide wall is curved toward and concentrically with the axis of the drive shaft 11. The curved inner end of the guide wall 12 extends for an angle of approximately 45°. The outer end region 12c of the guide wall 12 at the side wall 7 is aligned with the wall of an outlet stub 16 projecting outwardly from the side wall. Outlet stub 16 receives the dust collection bag 6 as depicted in FIG. 1. Protective hood 5 has a neck portion 17 extending upwardly from the upper end wall 8 as viewed in FIG. 3 into connection with the gearing head 2. In FIG. 3 it can be noted that the disk 4 passes freely through the slot 12a in guide wall 12 and the elastic sealing lips 15a of the layer 15 contact the surfaces of the disk as it rotates.

In FIG. 3 the drive shaft 11 can be noted on which a cap nut 18 is secured. The cap nut 18 has engagement bores 18a for clamping the disk against the hub 19a of a blower rotor 19. Blower rotor 19 rotates with the disk 4 and opens into a diversion channel 21. Diversion channel 21 is connected by a passage 21a with the part of the recovery space located above the disk 4. The outlet from the diversion channel 21 is provided by an opening 21b communicating with the outlet stub 16, note FIG. 4.

Waste material generated by the disk 4 is directed into the diversion space 13 of the protective hood 5 and is conducted by the guide wall 12 through the diversion space 13 and the outlet stub 16 into the dust collection bag 6. Any waste material clinging to the disk 4 is wiped off by the sealing lips 15a and is carried away with the other waste material passing through the diversion space 13. Any waste material not initially directed into the diversion space 13 is conveyed out of the recovery space 14 through the diversion channel 21 to the outlet stub 16. The discharge flow of the waste material is assisted by the blower rotor 19 arranged with its low pressure side connected to the passage 21a from the recovery space 13 and with its high pressure side through the opening 21b with the outlet stub 16.

In FIG. 5 another embodiment is shown of a blower rotor 26 stepped up to a higher rpm than the rpm of the disk 28 by a step-up gear 27. In FIG. 5 a protective hood 25 encloses the disk 28 and a guide wall, not shown, divides the interior of the hood into a diversion space, not shown, and a recovery space 25. The step-up gear is formed by a small crowned gear 29 connected with the blower rotor 26 and a crowned gear 31, larger than the small crown gear 29, with the larger crown gear receiving rotary motion from the drive shaft 32. Blower rotor 26 is located in a diversion channel 33 connected to the recovery space 25 through bores 33a. The opposite end of the diversion channel 33 is connected to an outlet stub, not shown. Disk 28 is clamped against the hub 31a by a cap nut 34.

While specific embodiments of the invention have been shown and described in detail to illustrate the application of the inventive principles, it will be understood that the invention may be embodied otherwise without departing from such principles.

We claim:

1. In a hand-held tool mounting a cutting or grinding disk, the invention comprising a drive shaft (11, 32) for mounting the disk, a protective hood (5, 24) partially enclosing and forming a space containing the disk, said hood (5, 24) comprising a pair end walls (8) arranged to extend on opposite sides of and parallel to the disk and an arcuate side wall (7) extending between said end walls and for a part of the circumferential extent of the disk, a waste material outlet stub (16) connected to and extending outwardly from said side wall and communicating with the space within said hood (5, 24), said side wall (7) in combination with said end walls (8) defining an opening (9) through which a portion of the disk can project, wherein the improvement comprises a guide wall (12) located within the space in said hood and extending between said end walls (8), and generally towards and chordally inward relative to said drive shaft from said side wall (7) and dividing the space within said hood into a diversion space (13) and a recovery space (14), said guide wall (12) having a slot (12a) therethrough generally parallel with said end walls and arranged so that the disk can pass through said slot, said diversion space located between said guide wall and said side wall and located on the opposite side of said drive shaft (11, 32) from said opening (9), said recovery space (14) located between the guide wall (12) and the opening (9) and containing said drive shaft (11, 32) and said diversion space (13) connected directly through said side wall to said outlet stub (16).

2. In a hand-held tool, as set forth in claim 1, wherein said guide wall (12) has an end region (12c) located at said side wall and in alignment with the wall of said outlet stub 3. In a hand-held tool, as set forth in claim 2, wherein said guide wall (12) extends rectilinearly inwardly from the end region (12c) generally toward said drive shaft and adjacent to said drive shaft has a curvilinear end region (12b) having a concave side facing said drive shaft.

4. In a hand-held tool, as set forth in claim 3, wherein said curvilinear end region (12b) of the said guide wall extends for an angle in the range of 30° to 60°.

5. In a hand-held tool, as set forth in claim 1, wherein said guide wall (12) on a side thereof facing into the diversion space (14) has sealing lips (15a) extending along said slot (12a) so that the lips are arranged to contact said disk, and said lips being formed of a elastic material.

6. In a hand-held tool, as set forth in claim 1, wherein said recovery space (14, 25) is in flow communication with said outlet stub (16) through a diversion channel (21, 33).

7. In a hand-held tool, as set forth in claim 6, wherein a blower rotor (19, 26) is located in said diversion channel (21, 33) adjacent to said recovery space (14, 25) for conveying air from said recovery space to said outlet stub (16).

8. In a hand-held tool, as set forth in claim 6, wherein said blower rotor (19) is mounted on said drive shaft (11) for the disk.

9. In a hand-held tool, as set forth in claim 7, wherein said blower rotor (26) is connected with said drive shaft (32) through a step-up gear (27).

* * * * *

UNITED STATES PATENT AND TRADEMARK OFFICE
CERTIFICATE OF CORRECTION

PATENT NO. : 5,033,192

DATED : July 23, 1991

INVENTOR(S) : Franz Hoyss & Rudolf Reitberger

It is certified that error appears in the above-identified patent and that said Letters Patent is hereby corrected as shown below:

On the title page, item [75] Inventors: should read as follows:

--Franz Hoyss, Wackersberg; Rudolf Reitberger, Munich, both of Fed. Rep. of Germany--.

Signed and Sealed this

Second Day of March, 1993

Attest:

STEPHEN G. KUNIN

*Attesting Officer*  *Acting Commissioner of Patents and Trademarks*